(12) United States Patent
Aoyama et al.

(10) Patent No.: US 10,121,598 B2
(45) Date of Patent: *Nov. 6, 2018

(54) METHOD FOR PRODUCING ELECTROLYTIC CAPACITOR

(71) Applicant: Panasonic Intellectual Property Management Co., Ltd., Osaka (JP)

(72) Inventors: Tatsuji Aoyama, Yamaguchi (JP);
Tomoyuki Tashiro, Yamaguchi (JP);
Yukiya Shimoyama, Yamaguchi (JP);
Takuya Maruta, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,256

(22) Filed: Dec. 12, 2016

(65) Prior Publication Data

US 2017/0092426 A1    Mar. 30, 2017

Related U.S. Application Data

(63) Continuation of application No. PCT/JP2015/002900, filed on Jun. 10, 2015.

(30) Foreign Application Priority Data

Jun. 23, 2014 (JP) .................................. 2014-128447

(51) Int. Cl.
*H01G 9/00* (2006.01)
*H01G 9/035* (2006.01)
*H01G 9/028* (2006.01)

(52) U.S. Cl.
CPC .......... *H01G 9/0029* (2013.01); *H01G 9/028* (2013.01); *H01G 9/035* (2013.01)

(58) Field of Classification Search
None
See application file for complete search history.

(56) References Cited

U.S. PATENT DOCUMENTS 8,767,377 B2 * 7/2014 Aoyama ................. H01G 9/02
361/502
9,153,384 B2 * 10/2015 Aoyama ................. H01G 9/02
(Continued)

FOREIGN PATENT DOCUMENTS

| JP | 2008-010657 | 1/2008 |
| JP | 2014-082392 | 5/2014 |
| WO | 2014/021333 | 2/2014 |

OTHER PUBLICATIONS

International Search Report of PCT application No. PCT/JP2015/002900 dated Aug. 4, 2015.

*Primary Examiner* — Asok K Sarkar
(74) *Attorney, Agent, or Firm* — McDermott Will & Emery LLP

(57) ABSTRACT

A method for producing an electrolytic capacitor according to the present disclosure includes a first step of preparing a capacitor element that includes an anode body having a dielectric layer; a second step of impregnating the capacitor element with a first treatment solution containing a conductive polymer and a first solvent; and a third step of impregnating the capacitor element with an electrolyte solution after the second step, the capacitor element being, in the third step, impregnated with the electrolyte solution while including a liquid.

23 Claims, 1 Drawing Sheet

(56) References Cited

U.S. PATENT DOCUMENTS

| | | | |
|---|---|---|---|
| 9,466,432 B2* | 10/2016 | Aoyama | H01G 9/0036 |
| 2008/0002334 A1 | 1/2008 | Kakuma et al. | |
| 2015/0213962 A1 | 7/2015 | Koseki et al. | |
| 2017/0092427 A1* | 3/2017 | Aoyama | H01G 9/0029 |
| 2017/0092428 A1* | 3/2017 | Aoyama | H01G 9/0032 |
| 2017/0148575 A1* | 5/2017 | Tsubaki | H01G 9/035 |

* cited by examiner

METHOD FOR PRODUCING ELECTROLYTIC CAPACITOR

BACKGROUND

1. Technical Field

The present disclosure relates to a method for producing an electrolytic capacitor, and, in more detail, relates to a method for producing an electrolytic capacitor in which an impregnation property of an electrolyte solution into a capacitor element is improved.

2. Description of the Related Art

Along with digitalization of electronic devices, compactification, large capacity, and low equivalent series resistance (ESR) in a high frequency range have been required of capacitors used in the electronic devices.

Conventionally, plastic film capacitors, laminated ceramic capacitors, and the like have been used as capacitors for a high frequency range in many cases, however, these capacitors are relatively small in capacity.

Promising candidates as small-sized, large capacity, and low ESR capacitors are electrolytic capacitors including as a cathode material a conductive polymer such as polypyrrole, polythiophene, polyfuran, or polyaniline. Proposed is, for example, a capacitor element that includes a dielectric layer-formed anode foil, and a solid electrolyte layer including a conductive polymer as a cathode material, which is provided on the anode foil.

It is pointed out that the electrolytic capacitor as described above is low in withstand voltage characteristics because the electrolytic capacitor is poor in restoration ability of the dielectric layer. Therefore, a technique has been developed for using an electrolyte solution excellent in the restoration ability of a dielectric layer in combination with a solid electrolyte layer. For example, PTL 1 discloses an electrolytic capacitor obtained by impregnating a solid electrolyte layer with an electrolyte solution.

CITATION LIST

Patent Literature

PTL 1: Unexamined Japanese Patent Publication No. 2008-010657

SUMMARY

Technical Problem

The restoration ability by the electrolyte solution is exhibited only when the electrolyte solution permeates a surface and an inside of the dielectric layer. Therefore, it is desired to improve an impregnation property of the electrolyte solution into a capacitor element.

Solution to Problem

A first aspect of the present disclosure relates to a method for producing an electrolytic capacitor, the method including a first step of preparing a capacitor element that includes an anode body having a dielectric layer; a second step of impregnating the capacitor element with a first treatment solution containing a conductive polymer and a first solvent; and a third step of impregnating the capacitor element with an electrolyte solution after the second step, the capacitor element being, in the third step, impregnated with the electrolyte solution while including a liquid.

Advantageous Effect of Disclosure

According to the present disclosure, there can be provided an electrolytic capacitor in which an impregnation property of an electrolyte solution into a capacitor element is improved.

DETAILED DESCRIPTION

<<Electrolytic Capacitor>>

Figure 1:
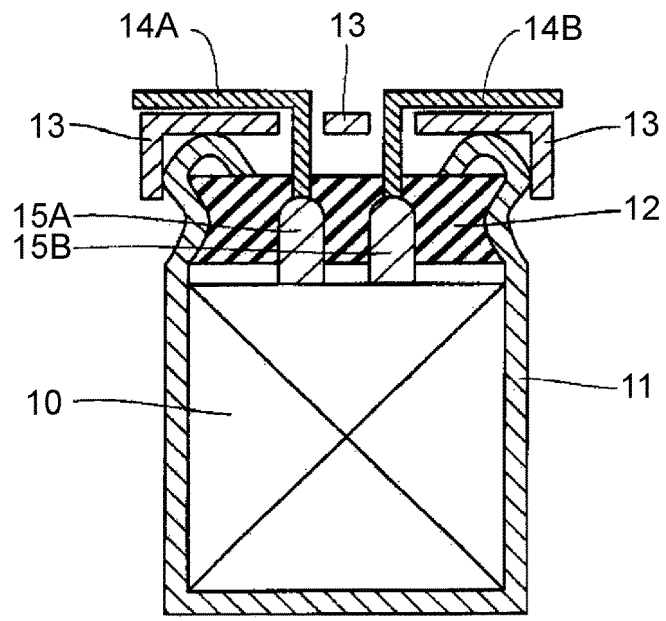
FIG. 1 is a schematic sectional view of an electrolytic capacitor according to an exemplary embodiment of the present disclosure.
Figure 2:
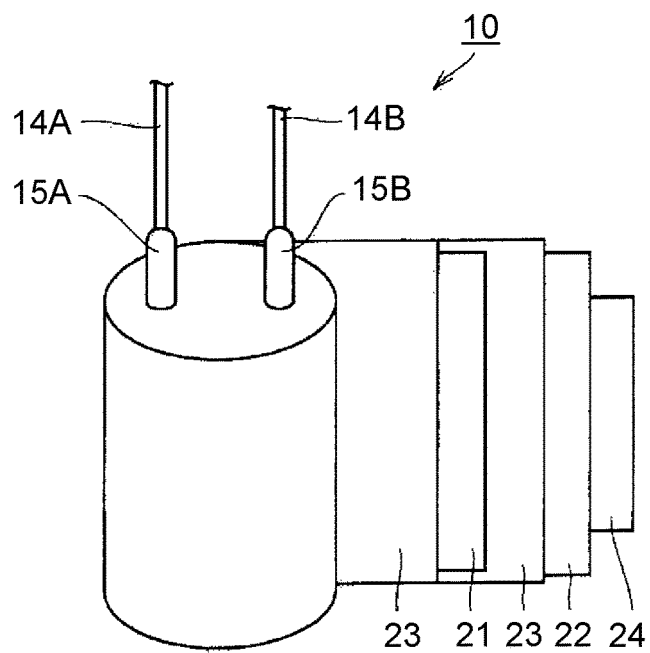
FIG. 2 is a schematic view illustrating a configuration of a capacitor element according to the same exemplary embodiment.

FIG. 1 is a schematic sectional view of an electrolytic capacitor according to a present exemplary embodiment, and FIG. 2 is a schematic view of a partially developed capacitor element included in the same electrolytic capacitor.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires to electrodes of capacitor element 10, respectively, and an electrolyte solution (not shown). Bottomed case 11 is, at a part near an opening end, processed inward by drawing, and is, at the opening end, swaged to sealing member 12 for curling.

Capacitor element 10 includes an anode body having a dielectric layer. For example, capacitor element 10 may include, in addition to anode body 21, lead tab 15A connected to anode body 21, cathode body 22, lead tab 15B connected to cathode body 22, and separator 23 interposed between anode body 21 and cathode body 22, as shown in FIG. 2. In this case, anode body 21 and cathode body 22 may be wound with separator 23 interposed between the anode body and the cathode body. An outermost periphery of capacitor element 10 is fixed with fastening tape 24. FIG. 2 shows partially developed capacitor element 10 before the outermost periphery of the capacitor element is fixed.

Anode body 21 includes a metal foil whose surface is roughened so as to include projections and recesses, and a dielectric layer is formed on the metal foil having the projections and recesses. A conductive polymer is attached to at least a part of a surface of the dielectric layer to form a conductive polymer layer. The conductive polymer layer may cover at least a part of a surface of cathode body 22 and/or a surface of separator 23. Conductive polymer layer-formed capacitor element 10 is housed in an outer case together with the electrolyte solution.

<<Method for Producing Electrolytic Capacitor>>

Hereinafter, an example of the method for producing an electrolytic capacitor according to the present exemplary embodiment is described according to each of steps.

(i) Step of Preparing Capacitor Element (First Step)

First, a raw material of anode body 21, i.e. a metal foil is prepared. A type of the metal is not particularly limited, but it is preferable to use a valve action metal such as aluminum, tantalum, or niobium, or an alloy including a valve action metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a DC electrolytic method or an AC electrolytic method.

Next, a dielectric layer is formed on the roughened surface of the metal foil. A method for forming the dielectric layer is not particularly limited, and the dielectric layer can be formed by subjecting the metal foil to a chemical conversion treatment. The chemical conversion treatment may be performed by, for example, immersing the metal foil in a chemical conversion solution such as an ammonium adipate solution, followed by application of a voltage.

Normally, a large foil of, for example, a valve action metal (metal foil) is subjected to a roughening treatment and a chemical conversion treatment from the viewpoint of mass productivity. In this case, the treated foil is cut into a desired size to prepare anode body 21.

Further, cathode body 22 is prepared.

A metal foil can also be used for cathode body 22 as with the anode body. A type of the metal is not particularly limited, but it is preferable to use a valve action metal such as aluminum, tantalum, or niobium, or an alloy including a valve action metal. A surface of cathode body 22 may be roughened as necessary. Further, on the surface of cathode body 22 may be provided a chemical conversion film, a film of a metal different from the metal that constitutes the cathode body (different type of metal), or a nonmetal film. Examples of the different type of metal and the nonmetal include metals such as titanium and nonmetals such as carbon, respectively.

Next, anode body 21 and cathode body 22 are wound with separator 23 interposed between the anode body and the cathode body. At this time, the winding can be conducted while lead tabs 15A, 15B connected to the electrodes, respectively, are rolled in the anode body, the cathode body and the separator, to cause lead tabs 15A, 15B to stand up from capacitor element 10 as shown in FIG. 2.

Separator 23 may include a fiber of for example, cellulose, polyethylene terephthalate, a vinylon, or a polyamide (e.g., an aliphatic polyamide fiber such as nylon and an aromatic polyamide fiber such as aramid). Thickness of separator 23 preferably ranges from 10 μm to 100 μm. Separator 23 having a thickness in this range increases an effect of suppressing a short circuit of the electrolytic capacitor.

A material for lead tabs 15A, 15B is not particularly limited as long as the material is a conductive material. Surfaces of lead tabs 15A, 15B may be subjected to a chemical conversion treatment. Further, lead tabs 15A, 15B may be covered with a resin material at a part in contact with sealing member 12 and a part connecting to lead wires 14A, 14B.

A material for lead wires 14A, 14B connected to lead tabs 15A, 15B, respectively, is not also particularly limited as long as the material is a conductive material.

Then, fastening tape 24 is disposed on an outer surface of cathode body 22 positioned at an outermost layer of anode body 21 wound, cathode body 22, and separator 23, to fix an end of cathode body 22 with fastening tape 24. When anode body 21 is prepared by cutting a large metal foil, capacitor element 10 may further be subjected to a chemical conversion treatment in order to provide a dielectric layer on a cut surface of anode body 21.

(ii) Step of Impregnating Capacitor Element with First Treatment Solution (Second Step)

Next, capacitor element 10 is impregnated with a first treatment solution.

A method for impregnating capacitor element 10 with the first treatment solution is not particularly limited. For example, there can be used a method for immersing capacitor element 10 in the first treatment solution housed in a container, and a method for dropping the first treatment solution onto capacitor element 10. An impregnation period depends on a size of capacitor element 10, but ranges, for example, from 1 second to 5 hours, preferably from 1 minute to 30 minutes. The impregnation may be conducted in an atmosphere under a reduced pressure ranging, for example, from 10 kPa to 100 kPa, preferably from 40 kPa to 100 kPa. Ultrasonic vibration may also be applied to capacitor element 10 or the first treatment solution while capacitor element 10 is impregnated with the first treatment solution.

The first treatment solution contains a conductive polymer and a first solvent. The first treatment solution may be either a solution of a conductive polymer or a dispersion liquid of a conductive polymer. The solution of a conductive polymer is a solution obtained by dissolving a conductive polymer in the first solvent, and the conductive polymer is uniformly distributed in the solution. In a case of the dispersion liquid of a conductive polymer, the conductive polymer is, in a state of particles, dispersed in a dispersion solvent containing the first solvent. The first treatment solution can be obtained by, for example, a method for dispersing particles of a conductive polymer in a dispersion solvent containing the first solvent, or a method for polymerizing a precursor monomer of a conductive polymer in a dispersion solvent containing the first solvent to generate particles of the conductive polymer in the dispersion solvent containing the first solvent.

Examples of the conductive polymer include polypyrrole, polythiophene, polyfuran, polyaniline, polyacetylene, polyphenylene, polyphenylene vinylene, polyacene, and polythiophene vinylene. A single one or two or more in combination of these conductive polymers may be used, or a copolymer of two or more monomers may also be used.

In the present disclosure, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like also include their derivatives. For example, polythiophene includes poly(3,4-ethylene dioxythiophene) and the like.

The conductive polymer may include a dopant. As the dopant, a polyanion can be used. Specific examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. Especially, a polyanion derived from polystyrenesulfonic acid is preferable. A single one or two or more in combination of these polyanions may be used. These polyanions may be a polymer of a single monomer or a copolymer of two or more monomers.

A weight average molecular weight of the polyanion is not particularly limited, and ranges, for example, from 1,000 to 1,000,000. A conductive polymer including such a polyanion is easily and uniformly dispersed in a dispersion solvent containing the first solvent, facilitating uniform attachment of the conductive polymer to the surface of the dielectric layer.

An average particle diameter of particles of the conductive polymer is not particularly limited, and can be appropriately adjusted by, for example, polymerization conditions and dispersion conditions. For example, the average particle diameter of particles of the conductive polymer may range from 0.01 µm to 0.5 µm. Here, the average particle diameter is a median diameter in a volume particle size distribution obtained by measurement with a particle diameter measuring apparatus according to dynamic light scattering.

Concentration of the conductive polymer (including a dopant, or a polyanion) in the first treatment solution preferably ranges from 0.5% by mass to 10% by mass. The first treatment solution having such a concentration is suitable for attachment of an appropriate amount of the conductive polymer and is easily impregnated into capacitor element 10 to give advantages for improvement of productivity.

The first solvent is not particularly limited, and may be water or a nonaqueous solvent. The nonaqueous solvent is a collective term for liquids except water, and includes an organic solvent and an ionic liquid. Especially, the first solvent is preferably a polar solvent from the viewpoint of improving electric conductivity. The polar solvent may be a protic solvent or an aprotic solvent.

Examples of the protic solvent include alcohols such as methanol, ethanol, propanol, butanol, ethylene glycol (EG), polyethylene glycol (PEG), propylene glycol, diethylene glycol monobutyl ether, glycerin, 1-propanol, butanol, polyglycerin, and isopropyl alcohol (IPA), formaldehyde, and water. Examples of the aprotic solvent include amides such as N-methylacetamide, N,N-dimethylformamide, and N-methyl-2-pyrrolidone; esters such as methyl acetate and γ-butyrolactone (γBL); ketones such as methyl ethyl ketone; ethers such as 1,4-dioxane; sulfur-containing compounds such as dimethylsulfoxide and sulfolane; and carbonate compounds such as propylene carbonate. The first treatment solution may contain these first solvents singularly or a plurality of different first solvents. Further, the first treatment solution may contain, together with the first solvent, a solvent different from the first solvent.

Especially, the first solvent is preferably a protic solvent. Particularly, the first solvent is preferably water. With the first solvent being water, handleability and dispersibility of particles of the conductive polymer are improved. Further, it is preferable to use, together with water, a nonaqueous solvent having a boiling point higher than a boiling point of water and having miscibility with water as the first solvent. Low viscosity water is easily impregnated into pores of the dielectric layer and an inside of etching pits. Therefore, even when the nonaqueous solvent used together with water has high viscosity, the nonaqueous solvent can also be impregnated into pores of the dielectric layer and an inside of etching pits.

Water, however, may possibly expand in a reflow process for mounting the electrolytic capacitor on a substrate, causing liquid leakage. Therefore, when water is used as the first solvent, it is desirable to remove most of impregnated water (e.g., 95% by mass or more). Even when water is removed, an electrolyte solution impregnated in a following third step is guided by a nonaqueous solvent (first solvent) remaining in pores of the dielectric layer and an inside of etching pits. Therefore, the electrolyte solution can be impregnated into pores of the dielectric layer and an inside of etching pits.

When the first solvent is water, water accounts for preferably 50% by mass or more, further preferably 70% by mass or more, particularly preferably 90% by mass or more of a dispersion solvent in the first treatment solution. Examples of the nonaqueous solvent (first solvent) used in combination with water include EG, PEG, propylene glycol, ethanol, and IPA.

(iii) Step of Impregnating Capacitor Element with Electrolyte Solution (Third Step)

Next, capacitor element 10 to which the first treatment solution has been applied is impregnated with an electrolyte solution.

Capacitor element 10 is impregnated with the electrolyte solution while including a liquid. Capacitor element 10 that includes a liquid allows easy impregnation of the electrolyte solution into the surface and pores of the dielectric layer and an inside of etching pits, as compared with a case of capacitor element 10 that does not include a liquid is impregnated with the electrolyte solution. The liquid included in the capacitor element may be the first solvent applied in the second step, a second solvent described later, or both the first and second solvents.

Impregnation of the electrolyte solution into the surface and pores of the dielectric layer and an inside of etching pits further improves self-restoration ability, further reducing leakage current of an electrolytic capacitor obtained. The electrolyte solution substantially functions as a cathode material, and a high impregnation property of the electrolyte solution into the dielectric layer enables acquisition of further large electrostatic capacity.

The conductive polymer contained in the first treatment solution is attached to the surface of the dielectric layer to form a conductive polymer layer. The conductive polymer layer also substantially functions as a cathode material. The present exemplary embodiment is a so-called hybrid capacitor, and it is expected to achieve both an effect brought about by using the electrolyte solution and an effect brought about by including the conductive polymer layer.

The conductive polymer in particles is attached to the dielectric layer. Drying particles of the conductive polymer removes a liquid (e.g., the first solvent) included in gaps formed by entanglement of polymer chains of the particles, to contract and solidify the particles of the conductive polymer. Contraction of particles of the conductive polymer increases gaps between the particles to cause the conductive polymer layer to be non-uniform so that mobility of a carrier decreases. As a result, adequate electrostatic capacity cannot be obtained, and ESR is likely to increase. It is difficult to include again a liquid in gaps of polymer chains or between particles of the conductive polymer that have once contracted, even when impregnation with a liquid is conducted after solidification of the particles.

In the present exemplary embodiment, capacitor element 10 is impregnated with the first treatment solution, and then capacitor element 10 is impregnated with the electrolyte solution while including a liquid, so that particles of the conductive polymer are never dried (solidified) completely until the electrolytic capacitor is completed. Accordingly, the conductive polymer layer is easily made uniform, allowing the conductive polymer layer to further exhibit an effect of reducing the ESR.

That is, it is possible to allow an electrolytic capacitor to adequately exhibit both the effect brought about by using the electrolyte solution and the effect brought about by including the conductive polymer layer, according to the present exemplary embodiment.

Impregnation with the electrolyte solution is conducted for a capacitor element that includes preferably 200 parts by mass to 10,000 parts by mass of the liquid, more preferably 300 parts by mass to 8,000 parts by mass of the liquid, particularly preferably 300 parts by mass to 1,000 parts by mass of the liquid, relative to 100 parts by mass of the conductive polymer with which the capacitor element has been impregnated. With these ranges of the liquid, the impregnation property of the electrolyte solution is further improved.

The electrolyte solution may be a nonaqueous solvent or a mixture containing a nonaqueous solvent and an ionic substance (solute, e.g., an organic salt) dissolved in the nonaqueous solvent. The nonaqueous solvent may be an organic solvent or an ionic liquid. The nonaqueous solvent is preferably a high boiling point solvent. For example, there can be used polyvalent alcohols such as ethylene glycol, polyethylene glycol (PEG), and propylene glycol; cyclic sulfones such as sulfolane (SL); lactones such as γ-butyrolactone (γBL); amides such as N-methylacetamide, N,N-dimethylformamide, and N-methyl-2-pyrrolidone; esters such as methyl acetate; ethers such as 1,4-dioxane; ketones such as methyl ethyl ketone; and formaldehyde. Especially, preferable examples of the electrolyte solution include γBL, SL, N-methyl-2-pyrrolidone, and dimethylsulfoxide. A single one or two or more in combination of these electrolyte solutions may be contained.

The organic salt may be a salt in which at least one of an anion and a cation includes an organic substance. As the organic salt, there can be used, for example, mono(trimethylamine) maleate, mono(triethylamine) borodisalicylate, mono(ethyldimethylamine) phthalate, mono(1,2,3,4-tetramethylimidazolinium) phthalate, and mono(1,3-dimethyl-2-ethylimidazolinium) phthalate.

Here, the liquid (the first solvent and/or a second solvent described later) preferably has miscibility with the electrolyte solution. With this property, the impregnation property of the electrolyte solution is further improved. The phrase "having miscibility" refers to a property by which the liquid is mixed together with the electrolyte solution to form a uniform state. For example, when the electrolyte solution contains 50% by mass or more of a protic solvent such as PEG, it is preferable that the liquid also contain a protic solvent. When the electrolyte solution contains 50% by mass or more of an aprotic solvent such as SL or γBL, it is preferable that the liquid also contain an aprotic solvent.

A method for impregnating the capacitor element with the electrolyte solution is not particularly limited. For example, there can be used a method for immersing the capacitor element in the electrolyte solution housed in a container, and a method for dropping the electrolyte solution onto the capacitor element. The impregnation may be conducted in an atmosphere under a reduced pressure ranging, for example, from 10 kPa to 100 kPa, preferably from 40 kPa to 100 kPa.

(iv) Step of Impregnating Capacitor Element with Second Treatment Solution (Fourth Step)

Capacitor element 10 that has been impregnated with the first treatment solution may further be impregnated with a second treatment solution after the second step but before the third step of impregnating the capacitor element with the electrolyte solution. With this step, the impregnation property of the electrolyte solution can be expected to be further improved. To the second treatment solution, it is possible to add, as a second solvent, a solvent that is difficult to add to the first treatment solution (e.g., such a solvent that deteriorates dispersibility of the conductive polymer). Thus, it is possible to impregnate the capacitor element with various solvents that further improve characteristics of the electrolytic capacitor.

The second treatment solution is sufficient as long as the second treatment solution contains at least a second solvent. The second solvent is not particularly limited, and may be the same as or different from the first solvent. Examples of the second solvent include the same solvents as exemplified as the first solvent. That is, the second solvent may be water or a nonaqueous solvent. Especially, the second solvent is preferably a polar solvent. The polar solvent may be a protic solvent or an aprotic solvent. Particularly, the second solvent is preferably an aprotic solvent, and examples of the aprotic solvent include γBL, SL, N-methyl-2-pyrrolidone, and dimethylsulfoxide.

Especially, the second treatment solution preferably contains a second solvent that has a boiling point higher than a boiling point of the first solvent. Further, the second treatment solution preferably contains a second solvent that has a boiling point higher than a boiling point of water. The second solvent having a boiling point higher than a boiling point of the first solvent (or water) accounts for preferably 30% by mass or more, further preferably 50% by mass or more, particularly preferably 70% by mass or more, relative to a whole solvent contained in the second treatment solution. For example, when the first treatment solution contains water as the first solvent, the second solvent having a boiling point higher than the boiling point of water can remain in the capacitor element even when drying is conducted under such conditions as water is removed in a fifth (b) step described later. That is, when the fourth step is conducted, capacitor element 10 may be impregnated with the electrolyte solution (third step) while including at least a part of the first solvent and/or the second solvent.

The second treatment solution may contain one second solvent or a plurality of different second solvents. The second treatment solution may further contain a solvent different from the second solvent. Examples of the solvent different from the second solvent similarly include the above-described solvents exemplified as the first solvent. A single one or two or more in combination of these solvents may be contained. The second treatment solution may also contain a solute. Examples of the solute include acids such as a carboxylic acid, a sulfonic acid, phosphoric acid, and boric acid and salts of these acids.

The second treatment solution is preferably impregnated into capacitor element 10 in an amount ranging from 200 parts by mass to 10,000 parts by mass relative to 100 parts by mass of the conductive polymer with which capacitor element 10 has been impregnated. With this range of the second treatment solution, the impregnation property of the electrolyte solution is more improved.

A method for impregnating capacitor element 10 with the second treatment solution is not particularly limited. Examples of the method include a method for immersing capacitor element 10 in the second treatment solution, a method for dropping the second treatment solution onto capacitor element 10, and a method for coating capacitor element 10 with the second treatment solution.

(v) Step of Removing Part of Liquid Included in Capacitor Element (Fifth Step)

Capacitor element 10 may be subjected to drying such as drying by heating or drying under reduced pressure to remove a part of the liquid before the third step of applying the electrolyte solution to capacitor element 10. With this step, an attachment property of particles of the conductive polymer is improved. A liquid removal amount and drying conditions are not particularly limited, but it is preferable to adjust an amount of the liquid included in the capacitor element to 200 parts by mass to 10,000 parts by mass relative to 100 parts by mass of the conductive polymer with which the capacitor element has been impregnated. When the first solvent is water, it is preferable to remove almost all water from the capacitor element by this step.

The fifth step is conducted after the second step but before the third step. When the step of impregnating the capacitor element with the second treatment solution (fourth step) is conducted before the third step, a removal step (fifth (a) step) may be conducted after the second step but before the fourth step, a removal step (fifth (b) step) may be conducted after the fourth step but before the third step, or each of the removal steps may be conducted at each timing. In the fifth (a) step, all the liquid (first solvent) impregnated may be removed. In this case, at least a part of the second solvent impregnated in the following step is included in the capacitor element during the third step. Especially, it is preferable to remove a part of the liquid in the fifth (b) step without conducting the fifth (a) step.

Treatment conditions for the fifth step, i.e., the fifth (a) step and the fifth (b) step (hereinafter, sometimes referred to as the fifth step, collectively) are not particularly limited, and may be the same or different. For example, when the first solvent is vaporized by heating, a heating temperature of the fifth step may be a temperature higher than a boiling point of the first solvent, and ranges preferably from 50° C. to 300° C., particularly preferably from 100° C. to 200° C., for example. The liquid removal amount and treatment conditions in the fifth step may be adjusted so that the amount of the liquid included in the capacitor element before the third step is 200 parts by mass to 10,000 parts by mass relative to 100 parts by mass of the conductive polymer with which the capacitor element has been impregnated.

With setting, as a series of steps, the step of applying the first treatment solution to the surface of the dielectric layer (second step), the fourth step conducted as necessary, and the fifth step also conducted as necessary, the series of steps may be repeated two or more times. Conducting this series of steps a plurality of times can increase coverage of particles of the conductive polymer on the dielectric layer. Alternatively, repetition may be conducted for a step. For example, the fifth (a) step, the fourth step, and further the fifth (b) step may be conducted after the second step is conducted a plurality of times.

(vi) Step of Encapsulating Capacitor Element

Next, the capacitor element to which the electrolyte solution has been applied is encapsulated. Specifically, first, the capacitor element is housed in bottomed case 11 so that lead wires 14A, 14B are positioned on an open upper surface of bottomed case 11. As a material for bottomed case 11, there can be used metals such as aluminum, stainless steel, copper, iron and brass, or an alloy of these metals.

Next, sealing member 12 formed so as to allow lead wires 14A, 14B to penetrate the sealing member is disposed above the capacitor element in which the conductive polymer layer is formed, to encapsulate the capacitor element in bottomed case 11. Sealing member 12 is sufficient as long as the sealing member is an insulating substance. As the insulating substance, an elastic body is preferable, and for example, high heat resistance silicone rubber, fluororubber, ethylene propylene rubber, Hypalon rubber, butyl rubber or isoprene rubber is especially preferable.

Next, bottomed case 11 is, at a part near an opening end, processed by transverse drawing, and is, at the opening end, swaged to sealing member 12 for curling. Last, base plate 13 is disposed on a curled part of the bottomed case to complete encapsulation. Subsequently, an aging treatment may be performed while a rated voltage is applied.

In the exemplary embodiment described above, a wound electrolytic capacitor has been described. The application range of the present disclosure, however, is not limited to the wound electrolytic capacitor, and can be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is described in more detail with reference to examples. The present disclosure, however, is not limited to the examples.

Example 1

In the present examples, manufactured was a wound electrolytic capacitor (1) 6.3 mm×L (length) 5.8 mm) having a rated voltage of 35 V and a rated electrostatic capacity of 47 µF. Hereinafter, a specific method for producing the electrolytic capacitor is described.

(Step of Preparing Anode Body)

A 100-µm-thick aluminum foil was subjected to etching to roughen a surface of the aluminum foil. Then, a dielectric layer was formed on the surface of the aluminum foil by a chemical conversion treatment. The chemical conversion treatment was performed by immersing the aluminum foil in an ammonium adipate solution, followed by application of a voltage of 60 V.

(Step of Preparing Cathode Body)

A 50-µm-thick aluminum foil was subjected to etching to roughen a surface of the aluminum foil.

(First Step: Manufacture of Capacitor Element)

An anode lead tab and a cathode lead tab were connected to the anode body and the cathode body, respectively, and the anode body and the cathode body were would with a separator interposed between the anode body and the cathode body while the lead tabs were rolled in the anode body, the cathode body and the separator, to give a capacitor element. Ends of the lead tabs protruding from the capacitor element were connected to an anode lead wire and a cathode lead wire, respectively. Then, the manufactured capacitor element was subjected to a chemical conversion treatment again to form a dielectric layer at a cut end of the anode body. Next, an end of an outer surface of the capacitor element was fixed with a fastening tape.

(Second Step: Impregnation with First Treatment Solution)

A mixed solution was prepared by dissolving 3,4-ethylene dioxythiophene and dopant polystyrenesulfonic acid in ion-exchanged water (first solvent). Ferric sulfate and sodium persulfate dissolved in ion-exchanged water were added to the resultant mixed solution while the mixed solution was stirred, to cause a polymerization reaction. After the reaction, the resultant reaction solution was dialyzed to remove unreacted monomers and an excessive oxidant so that a first treatment solution was obtained, which included a dispersion liquid containing about 5% by mass of polyethylene dioxythiophene doped with polystyrenesulfonic acid.

Then, the capacitor element was impregnated with the resultant first treatment solution for 5 minutes.

(Fourth Step: Impregnation with Second Treatment Solution)

The capacitor element in which the first treatment solution remained was impregnated with a second treatment solution containing γBL as the second solvent.

(Fifth (Fifth (b)) Step: Drying Step)

Next, the capacitor element was dried at 150° C. for 30 minutes to form a conductive polymer layer in the capacitor element. In the dried capacitor element, a liquid remained in an amount of 1,000 parts by mass relative to 100 parts by mass of the conductive polymer with which the capacitor element had been impregnated.

(Third Step: Impregnation with Electrolyte Solution)

PEG, γBL, SL, and mono(ethyldimethylamine) phthalate (solute) were mixed in a mass ratio of 25:25:25:25 to prepare an electrolyte solution. The capacitor element in which the liquid remained was impregnated with this electrolyte solution.

(Step of Encapsulating Capacitor Element)

The electrolyte solution-impregnated capacitor element was housed in an outer case as shown in FIG. 1 and encapsulated to manufacture an electrolytic capacitor.

For the resultant electrolytic capacitor, electrostatic capacity, ESR, and leakage current (LC) were measured. Results are shown in Table 1. Each of characteristic values was acquired as an average of 300 samples.

Example 2

An electrolytic capacitor was manufactured in the same manner as in Example 1 except that a second treatment solution containing SL as the second solvent was used, and the electrolytic capacitor was evaluated. Results are shown in Table 1.

Example 3

An electrolytic capacitor was manufactured in the same manner as in Example 1 except that a first treatment solution was used, which contained, as the first solvent, water and EG in a mass ratio of 75:25, and the capacitor element was not impregnated with the second treatment solution. In the capacitor element directly before impregnation with the electrolyte solution, a liquid (first solvent) remained in an amount of 300 parts by mass relative to 100 parts by mass of the conductive polymer with which the capacitor element had been impregnated. Evaluation results are shown in Table 1.

Example 4

An electrolytic capacitor was manufactured in the same manner as in Example 1 except that a drying step (fifth (a) step, drying conditions: 150° C., 30 min.) was conducted consecutively after the second step, and then the capacitor element was impregnated with the second treatment solution. In the capacity element directly before impregnation with the electrolyte solution, a liquid (second solvent) remained in an amount of 1,000 parts by mass relative to 100 parts by mass of the conductive polymer with which the capacitor element had been impregnated. Evaluation results are shown in Table 1.

Comparative Example 1

An electrolytic capacitor was manufactured in the same manner as in Example 1 except that the drying step (fifth step, drying conditions: 150° C., 30 min.) was conducted consecutively after the second step, and the capacitor element was not impregnated with the second treatment solution. A liquid was not confirmed in the capacitor element directly before impregnation with the electrolyte solution. Evaluation results are shown in Table 1.

Comparative Example 2

An electrolytic capacitor was manufactured in the same manner as in Example 1 except that the drying step (fifth (a) step, drying conditions: 150° C., 30 min.) was conducted consecutively after the second step, and the fifth (b) step was conducted under conditions of 180° C. and 60 min. A liquid was not confirmed in the capacitor element directly before impregnation with the electrolyte solution. Evaluation results are shown in Table 1.

Comparative Example 3

An electrolytic capacitor was manufactured in the same manner as in Example 1 except that the fifth (b) step was conducted under conditions of 180° C. and 60 min. A liquid was not confirmed in the capacitor element directly before impregnation with the electrolyte solution. Evaluation results are shown in Table 1.

TABLE 1

| | Evaluation | | |
|---|---|---|---|
| | Electrostatic capacity/μF | ESR/mΩ | LC/μA |
| Example 1 | 41.2 | 23.2 | 2.29 |
| Example 2 | 41.8 | 24.3 | 1.85 |
| Example 3 | 40.9 | 28.2 | 1.1 |
| Example 4 | 41.1 | 27.1 | 0.94 |
| Comparative Example 1 | 27.5 | 64.3 | 12.21 |
| Comparative Example 2 | 33.3 | 82.7 | 10.9 |
| Comparative Example 3 | 35.2 | 70.5 | 11.8 |

In Examples 1 to 4 in which the capacitor element including a liquid was impregnated with the electrolyte solution showed an excellent value in each of the electrostatic capacity, the ESR, and the LC, as compared with Comparative Examples 1 to 3 in which the capacitor element not including a liquid was impregnated with the electrolyte solution.

The present disclosure can be used for electrolytic capacitors including a conductive polymer layer and an electrolyte solution as cathode materials.

What is claimed is:

1. A method for producing an electrolytic capacitor, the method comprising:
   a first step of preparing a capacitor element that includes an anode body having a dielectric layer;
   a second step of impregnating the capacitor element with a first treatment solution containing a conductive polymer and a first solvent; and
   a third step of impregnating the capacitor element with an electrolyte solution after the second step,
   wherein the capacitor element is, in the third step, impregnated with the electrolyte solution while the first solvent is remaining in the capacitor element.

2. The method for producing an electrolytic capacitor according to claim 1, wherein the first treatment solution contains water as a solvent other than the first solvent.

3. The method for producing an electrolytic capacitor according to claim 2, further comprising a fifth step of removing at least a part of the water included in the capacitor element after the second step and before the third step.

4. The method for producing an electrolytic capacitor according to claim 2, wherein the capacitor element is, in the third step, impregnated with the electrolyte solution while including 200 parts by mass to 10,000 parts by mass of the first solvent relative to 100 parts by mass of the conductive polymer with which the capacitor element has been impregnated.

5. The method for producing an electrolytic capacitor according to claim 2, wherein the first solvent has miscibility with the electrolyte solution.

6. The method for producing an electrolytic capacitor according to claim 2, wherein the first solvent has a boiling point higher than a boiling point of water.

7. The method for producing an electrolytic capacitor according to claim 1, wherein the first treatment solution contains water as the first solvent.

8. The method for producing an electrolytic capacitor according to claim 7, further comprising a fifth step of removing at least a part of the water included in the capacitor element after the second step but before the third step.

9. The method for producing an electrolytic capacitor according to claim 7, wherein the capacitor element is, in the third step, impregnated with the electrolyte solution while including 200 parts by mass to 10,000 parts by mass of the first solvent relative to 100 parts by mass of the conductive polymer with which the capacitor element has been impregnated.

10. The method for producing an electrolytic capacitor according to claim 7, wherein the first solvent has miscibility with the electrolyte solution.

11. A method for producing an electrolytic capacitor, the method comprising:
    a first step of preparing a capacitor element that includes an anode body having a dielectric layer;
    a second step of impregnating the capacitor element with a first treatment solution containing a conductive polymer and a first solvent; and
    a third step of impregnating the capacitor element with an electrolyte solution after the second step, wherein:
    the method comprises a fourth step of impregnating the capacitor element with a second treatment solution containing a second solvent other than water after the second step but before the third step, the second treatment solution being different from the first treatment solution, and
    the capacitor element is, in the third step, impregnated with the electrolyte solution while the second solvent is remaining in the capacitor element.

12. The method for producing an electrolytic capacitor according to claim 11, wherein the first treatment solution contains water as the first solvent.

13. The method for producing an electrolytic capacitor according to claim 12, further comprising a fifth step of removing at least a part of the water included in the capacitor element after the second step but at least before the third step.

14. The method for producing an electrolytic capacitor according to claim 12, wherein the capacitor element is, in the third step, impregnated with the electrolyte solution while including 200 parts by mass to 10,000 parts by mass of the second solvent relative to 100 parts by mass of the conductive polymer with which the capacitor element has been impregnated.

15. The method for producing an electrolytic capacitor according to claim 12, wherein the second solvent has miscibility with the electrolyte solution.

16. The method for producing an electrolytic capacitor according to claim 12, wherein the second solvent has a boiling point higher than a boiling point of water.

17. The method for producing an electrolytic capacitor according to claim 11, wherein the first treatment solution further contains water as a solvent other than the first solvent.

18. The method for producing an electrolytic capacitor according to claim 17, further comprising a fifth step of removing at least a part of the water included in the capacitor element after the second step but at least before the third step.

19. The method for producing an electrolytic capacitor according to claim 17, wherein the capacitor element is, in the third step, impregnated with the electrolyte solution while including 200 parts by mass to 10,000 parts by mass of the second solvent relative to 100 parts by mass of the conductive polymer with which the capacitor element has been impregnated.

20. The method for producing an electrolytic capacitor according to claim 17, wherein the second solvent has miscibility with the electrolyte solution.

21. The method for producing an electrolytic capacitor according to claim 17, wherein the second solvent has a boiling point higher than a boiling point of water.

22. The method for producing an electrolytic capacitor according to claim 21, wherein the first solvent has a boiling point higher than a boiling point of water.

23. The method for producing an electrolytic capacitor according to claim 22, wherein the second solvent has a boiling point higher than a boiling point of the first solvent.

* * * * *